June 26, 1928.
F. B. PFEIFFER
APPARATUS FOR BUILDING TIRES
1,675,130
Original Filed Feb. 23, 1923   3 Sheets-Sheet 1
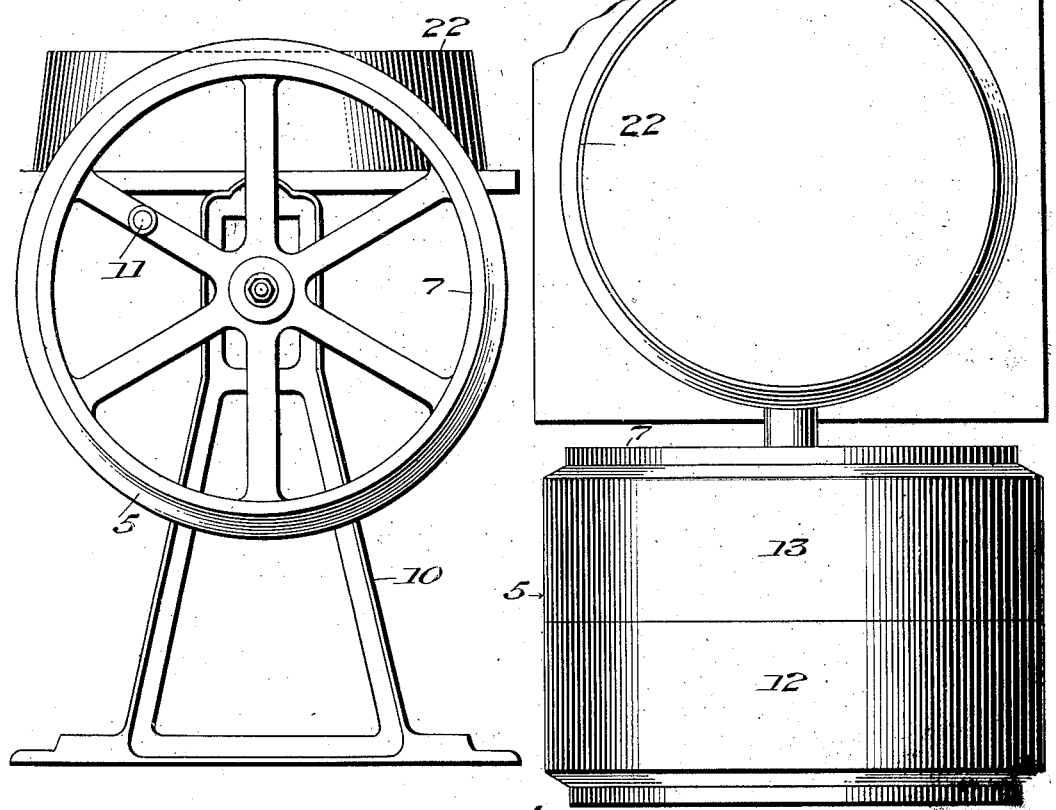
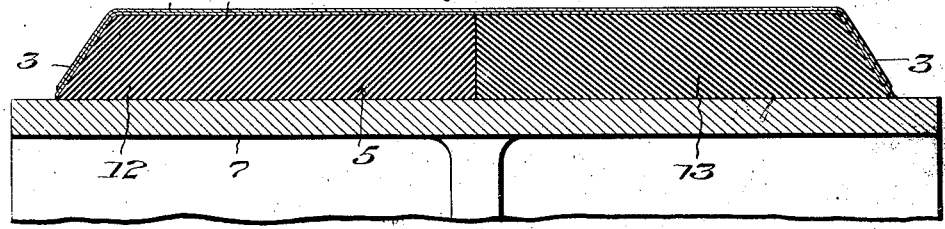
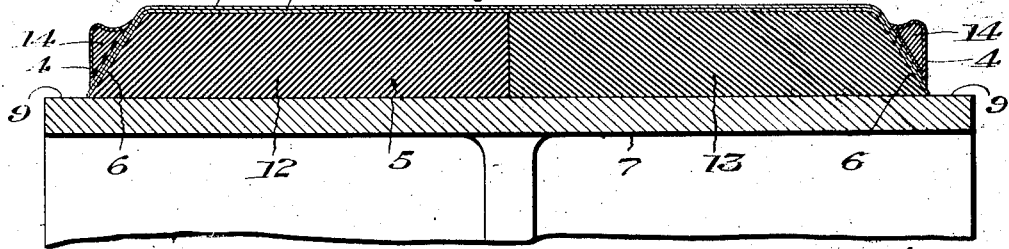
Inventor
Fred Brown Pfeiffer
By
Attorney June 26, 1928.  1,675,130
F. B. PFEIFFER
APPARATUS FOR BUILDING TIRES
Original Filed Feb. 23, 1923   3 Sheets-Sheet 2
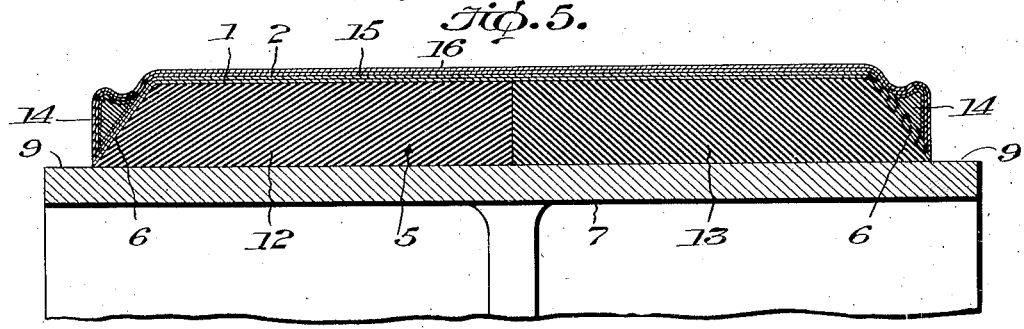
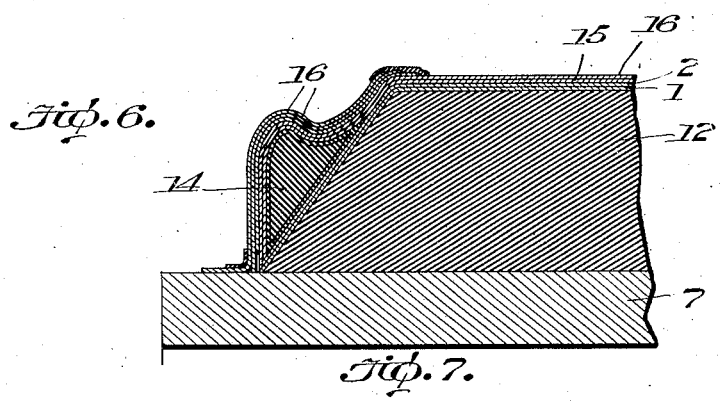
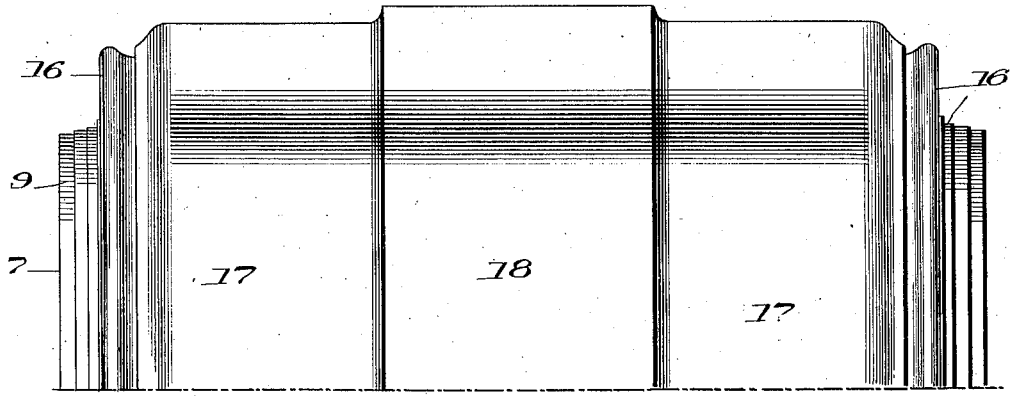
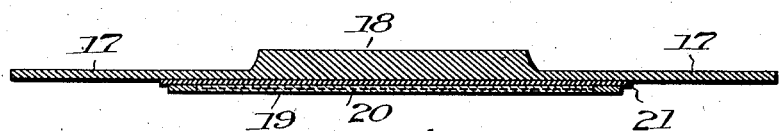
Inventor
Fred Brown Pfeiffer
By
Attorney June 26, 1928.
F. B. PFEIFFER
APPARATUS FOR BUILDING TIRES
Original Filed Feb. 23, 1923　　3 Sheets-Sheet 3
1,675,130
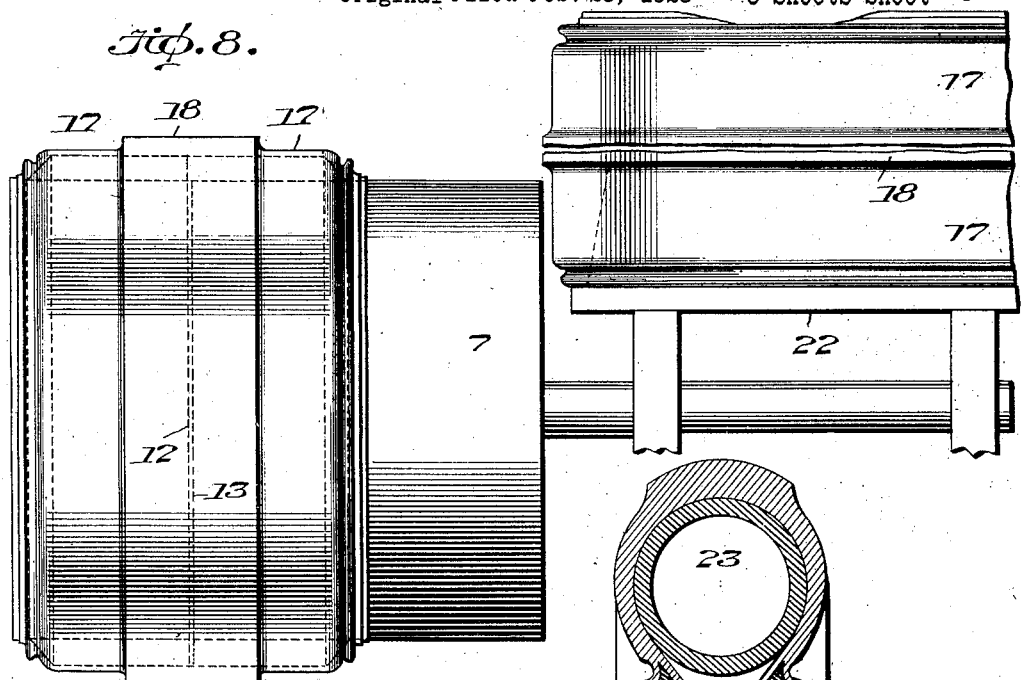
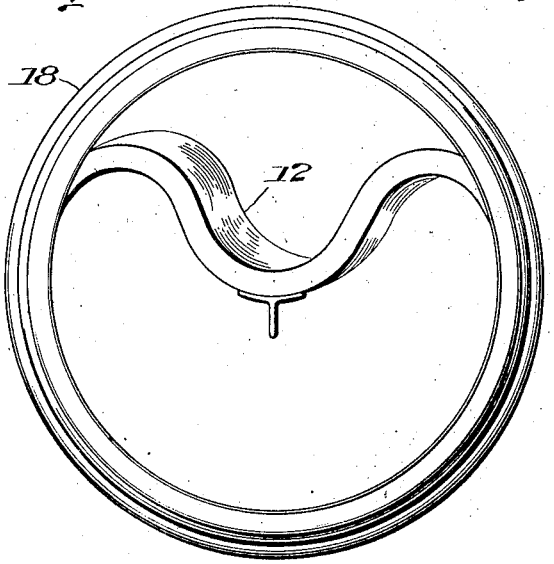
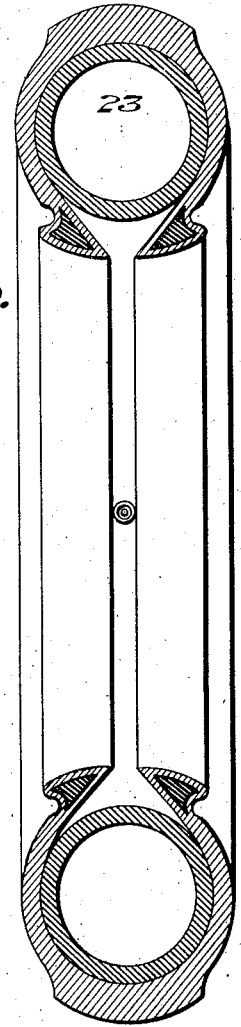
Inventor
Fred Brown Pfeiffer
By
Attorney Patented June 26, 1928.

1,675,130

UNITED STATES PATENT OFFICE.

FRED BROWN PFEIFFER, OF AKRON, OHIO.

APPARATUS FOR BUILDING TIRES.

Application filed February 23, 1923, Serial No. 620,702. Renewed April 30, 1928.

My invention relates to improvements in methods of constructing the so-called "drum built" or "flat band" tires, and to apparatus for use in practising the method.

Prior to my invention it has been the practice to build such tires upon a drum or cylinder having a transversely flat face upon which the fabric plies and bead strips are assembled in the form of a flat band to be subsequently expanded into the contour of a tire. This practice results in a band of the same inside diameter throughout its width. In other words, the portion of the band intermediate the beads is built to the diameter of the beads. I have found in expanding a band of this character that when the intermediate portion is expanded from the beads into the form of a tire, the cords of the fabric are spread too far apart. This results in an inferior grade of tire.

Furthermore, in building tires of this type it is impossible to fit a complete bead ring of the proper diameter over the drum and the under plies of the carcass without using a complicated drum structure which may be contracted and expanded.

It is the primary purpose of the present invention to improve generally upon the methods heretofore practised in constructing drum built tires and particularly to provide a method and apparatus whereby the disadvantages above set forth may be overcome and a better tire provided in a shorter space of time and with less expensive equipment.

Other objects and advantages will appear when the following description of my invention has been read and upon reference to the accompanying drawings and the claims appended hereto.

In the drawings:

Figure 1 is a side elevational view showing a preferred form of apparatus for use in practising my method;

Figure 2 is a top plan view of Figure 1;

Figure 3 is an enlarged transverse sectional view through the upper surface of the drum illustrating the first step of my method;

Figure 4 is a similar view illustrating the manner in which the bead rings are applied in building a tire according to my method;

Figure 5 is another transverse sectional view illustrating another step in the method;

Figure 6 is a fragmentary sectional view on a further enlarged scale showing the application of the chafing strips;

Figure 7 is an elevational view showing the application of the tread and the sidewalls;

Figure 7$^a$ is a transverse sectional view illustrating the manner in which I assemble the tread elements and side-walls into a unitary structure before applying them to the carcass;

Figure 8 is a front elevational view of my apparatus showing the completed band thereon and partially removed therefrom;

Figure 9 is a side elevational view of a band illustrating another step in the method; and Figure 10 shows the band after it has been expanded upon an air bag into the form of a tire.

In the manufacture of tires the first layer or layers of fabric constituting the carcass of the tire are formed as a band about the form 5, the margins or edges of which are inclined downwardly or toward the axis of the tire. Upon these marginal surfaces are placed the beads of the tire. In the drawings the first two layers of fabric are indicated by the numerals 1 and 2 and the inclined marginal portions of the fabric are indicated by the numeral 3. The beads which are indicated by the numeral 14 are placed upon and secured to the edges of the band with their flat sides against the marginal edges.

The operations are performed upon a flexible ring shaped annulus 5 which is provided with cylindrical outer surface except at its edges 6 which are beveled to form the marginal supports for the beads. The annulus 5 is removably supported in a central position upon a solid pulley or continuous drum 7. The drum 7 preferably projects beyond the edges of the annulus 5 to form cutting surfaces 9 for trimming around the toes of the beads. Any suitable means for rotatably mounting the drum 7 may be utilized, such as the stand 10, and a crank 11 may be affixed to the drum so that it may be rotated manually when the plies are being positioned and stitched thereon. The outside diameter of the drum 7 and the inside diameter of the annulus 5 are such that continuous inextensible bead rings may be positioned laterally against the inclined bead receiving surfaces 3 of the band. The annulus 5 is preferably formed of rubber, although other flexible material may be employed. In this instance, it is split to provide two sections 12 and 13 for a particular purpose presently explained.

The bead rings 14 are now positioned in the manner indicated above and two outer plies 15 and 16 are stitched over the plies 1 and 2 and the bead rings 14. Chafing strips 16 may be added in the usual position relative to the beads and the band is ready to receive the tread elements and side-walls.

I prefer to apply these last elements in the form of a single strip which includes side-walls 17, a tread portion 18, a cushion strip 19, and a breaker strip 20. An under tread strip 21 may be added if desired. This combination strip is applied in the usual manner and stitched or rolled upon the outer ply of the carcass.

The annulus 5 is now moved toward one edge of the drum 7 until one of the sections 12 or 13 is moved off the surface of the drum, as shown in Figure 8. This section of the annulus may now be removed by flexing it inwardly, as shown in Figure 9, either by hand or with a suitable prying tool. This leaves one-half of the tire overhanging the drum 7 so that the chafing strip may be stitched around the toe of the bead. The band and the other section are next moved as a unit off the drum 7 and the tire placed with its finished bead down upon a stand or form 22 so that this section may be removed and the chafing strips on the other side stitched around the toe of the opposite bead.

The tire band may now be expanded into the form of a tire, for instance upon an air bag 23, as shown in Figure 10, and vulcanized in any suitable manner.

The advantages of this method are as follows. The band is built with a greater diameter than that of the beads. Hence it is not necessary to expand it so far from the beads to give it the proper contour and the cords are not separated to the extent that occurs in practising other methods. This results in a better union of the cords and plies during vulcanization and a closer arrangement of the cords, particularly at the tread zone of the tire. Another advantage arises from building the band with the beads arranged in this particular position. They are brought closer together into their normal position when the band is expanded. Again in practising the method, inextensible bead rings may be used without the use of an expansible and contractile drum. This results in shortening the tire building operation materially and reducing the cost of equipment. Also the bead rings can be more accurately positioned upon the plies.

The foregoing constitutes a detailed description of a preferred form of my method and one type of apparatus for use in the practice thereof, but it is not to be construed as restricting the invention to the precise steps and form of apparatus disclosed as changes and modifications may be resorted to within the spirit of the invention and the scope of the claims appended hereto.

What I claim is:

1. Apparatus for use in constructing tires comprising, a support, a rotatable flat surfaced drum upon the support, and a removable annulus of flexible material surrounding the drum said annulus having beveled edges providing bead seats.

2. Apparatus for use in constructing tires comprising, a support, a flat surfaced rotatable drum upon the support, and a removable flat surfaced annulus of flexible material upon the drum provided with beveled edges providing bead seats.

3. Apparatus for use in constructing tires comprising, a support, a rotatable drum upon the support, and a flat surfaced annulus of flexible material formed with beveled edges providing bead seats and removably mounted upon the drum.

4. Apparatus for use in constructing tires comprising, a support, a rotatable drum upon the support, and a flat surfaced sectional annulus of flexible material removably mounted upon the drum.

5. Apparatus for use in constructing tires comprising, a support, a rotatable drum upon the support, and a flat surfaced sectional annulus of flexible material removably mounted upon the drum said annulus having beveled edges.

6. Apparatus for use in constructing tires comprising, a support, a rotatable drum upon the support, and a flat surfaced annulus of rubber composition removably mounted upon the drum.

7. Apparatus for use in constructing tires comprising, a support, a rotatable drum upon the support, and an annulus of rubber composition surrounding the drum said annulus having beveled edges.

8. Apparatus for use in constructing tires comprising, a support, a rotatable drum upon the support, and a sectional annulus of rubber composition surrounding the drum said annulus having beveled edges.

9. Apparatus for use in constructing tires comprising, a support, a rotatable drum upon the support, and a sectional annulus of rubber composition surrounding the drum said annulus having beveled edges spaced from the edges of the drum.

FRED BROWN PFEIFFER.